Sept. 17, 1968          H. SIGG          3,401,580

PLANETARY GEARING DRIVE TRANSMISSION

Filed Dec. 17, 1965          2 Sheets-Sheet 1

United States Patent Office 3,401,580
Patented Sept. 17, 1968

3,401,580
PLANETARY GEARING DRIVE TRANSMISSION
Hans Sigg, Aargau, Switzerland, assignor to Maag Gear Wheel & Machine Company Limited, Zurich, Switzerland, a Swiss company
Filed Dec. 17, 1965, Ser. No. 514,607
Claims priority, application Switzerland, Dec. 23, 1964, 16,593/64
2 Claims. (Cl. 74—801)

ABSTRACT OF THE DISCLOSURE

Planetary gearing drive transmission, comprising two similar sun and planet assemblies parallelly mounted and connected to each other by a rim gear mounted on a common carrier, the two sun wheels of said assemblies being mounted respectively at the adjacent inner ends of two concentric shafts which are connected together and have substantially the same torsional rigidity, whereby the torques which the transmission is required to transmit are distributed substantially uniformly between the two assemblies.

---

This invention relates to planetary gearing drive transmissions, the object being to provide improvements therein.

A limiting factor in the operation of planetary gearing drive transmissions in which a planet wheel carrier rotates is the centrifugal forces produced by the rotating planet wheels, for such forces may become greater than can properly be dealt with by the bearings for the planet wheels. There is therefore a top speed limit for every planetary gearing transmission which includes a rotating planet wheel carrier, or, put in another way, for a particular planet wheel carrier speed there is a maximum permissible diameter and therefore a maximum transmissible power. One apparent way of increasing transmissible power is to widen the gearwheels; unfortunately, there are optimum gearwheel widths in planetary gearing transmissions, and, in any case, the optimum values are taken into consideration in a good design, and increasing them does not provide any advantages.

Consequently, the only effective way of increasing the power which a planetary gearing transmission can handle is to connect a number of sets of planet wheels in parallel with one another. Since there are unavoidable manufacturing tolerances in parallel-connected systems of this kind and since there are torsionally resilient distortions of the shafts and of the planet wheel carrier, it has been proposed that, to distribute the load uniformly between the individual parallel-connected sets of planet wheels, compensating means, whose bearing positions are connected to the stationary part of the transmission, be disposed between the sunwheels receiving the reaction torque. Unfortunately, this suggestion leads to a relatively expensive mechanism and construction of the transmission, and more particularly of the compensating means with their bearing places on the stationary part of the transmission.

According to this invention, a planetary gearing drive transmission, comprising two similar sun-and-planet assemblies disposed parallel to each other, each said assembly comprising a sun wheel, a group of planet gears, and an outer internally toothed rim gear, the two said assemblies being connected to each other by means of the two rim gears which are mounted on a common carrier, each planet gear being mounted freely rotatable on a spindle carried by a planet gear carrier, the planet gear carriers being rotatable solidly with each other, the two sun wheels of the two said assemblies being mounted on a quill drive comprising two concentric shafts connected to each other and to a drive transmission element at one end, one of the said sun wheels being mounted rigidly on the free end of the inner shaft of the said two quill drive shafts and the other said sun wheel being mounted rigidly on the free end of the outer shaft of the said two quill drive shafts, characterized in that the two concentric shafts of the quill drive have substantially the same torsional rigidity whereby the torques which the transmission is required to transmit are distributed substantially uniformly between the two said assemblies entirely alone and independently of any other device.

The sun-and-planet assemblies can each have a single helical tooth gearing system, the two tooth systems being oppositely handed. Conveniently, the two concentric shafts of the quill drive have substantially the same torsional rigidity. The two parallel-connected sun-and-planet assemblies are then bound to share the total load with one another equally. For instance, if one of the assemblies should transmit a larger proportion of the load than the other, the quill drive shaft associated with the more heavily loaded assembly lags, but the quill drive shaft associated with the more lightly loaded assembly assumes a corresponding lead, because the sun wheels of the two parallel-connected assemblies are interconnected only by way of the two quill drive shafts and the planet gears of the two assemblies are so mounted on their spindles as to be rotatable independently of one another. The result of this lead and lag effect is that the tooth flanks of the more lightly loaded sun wheel move relatively to the tooth flanks of the planet gears meshing with such sun wheel, to give a compensated load.

Planetary gearing drive transmission according to this invention is shown in the accompanying drawings, wherein.

Figure 1:
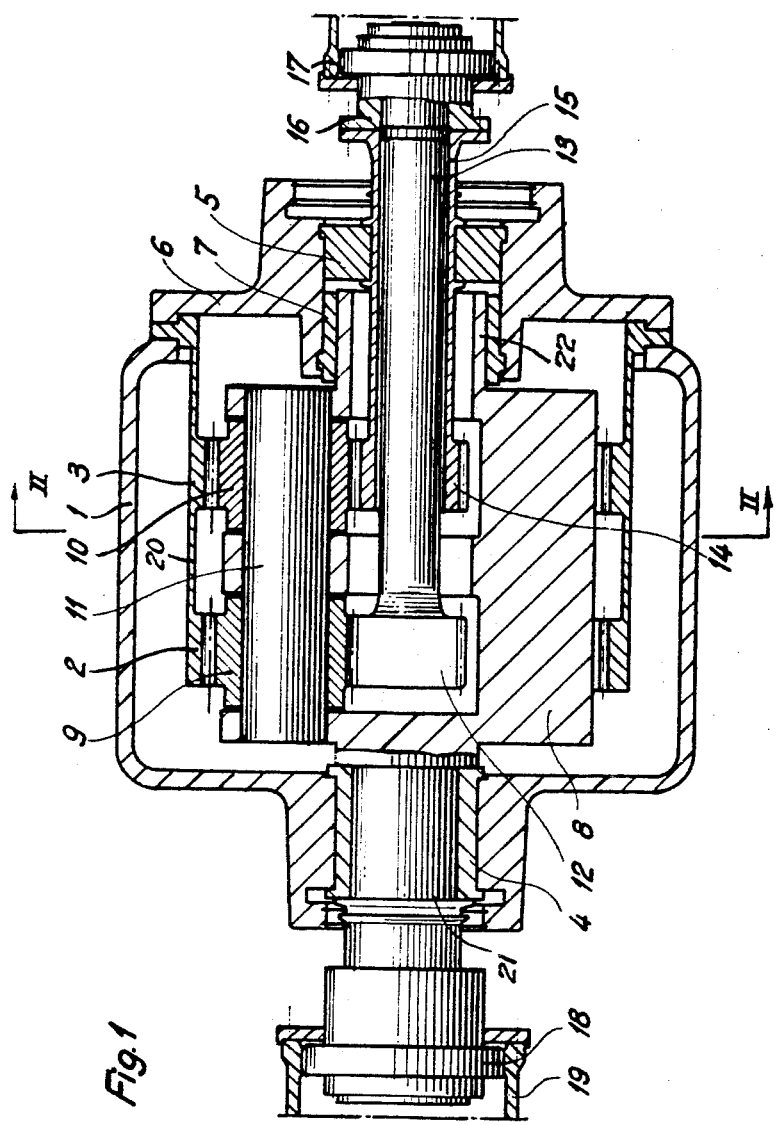
FIG. 1 is a longitudinal sectional elevation of one embodiment of the invention, taken on line I—I in FIG. 2.
Figure 2:
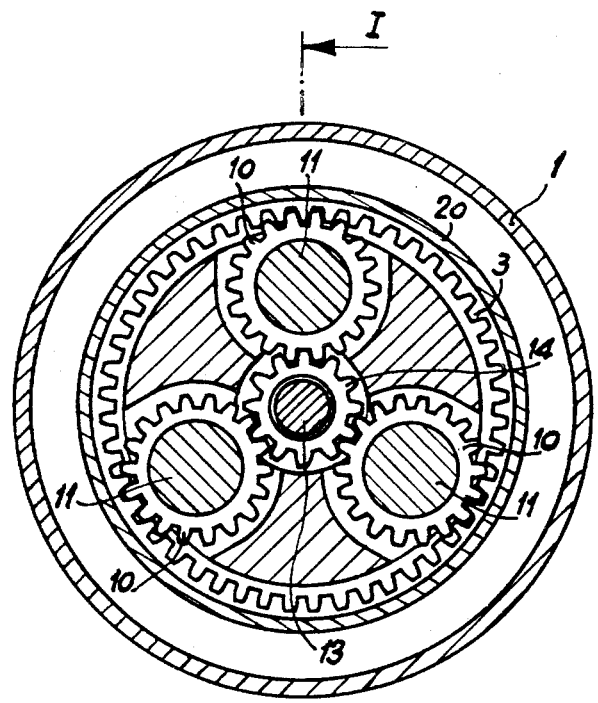
FIG. 2 is a transverse sectional elevation, taken on line II—II in FIG. 1.

Referring to FIGS. 1 and 2 a housing 1, having a bearing shield 6 at one end, is provided with a cylindrical carrier 20 which carries two annular internally toothed gears 2 and 3. The bearing shield 6 and the carrier 20 are rigidly secured to the housing 1.

For the purposes of the present specification, the right-hand end of the device shown in FIG. 1, including a drive coupling sleeve 17, is considered to be the drive input end, whilst the left-hand end in the figure, including a drive coupling sleeve 19, is considered to be the drive output end, but either of the said ends could be the drive input end or the drive output end.

At the output end of the housing 1 there is a bearing 4 in which the shaft 21 on one end of a planet gear carrier 8 is rotatably mounted but immovable axially. The shaft 21 is connected to a coupling element 18 by which the drive output is transmitted to the coupling sleeve 19.

The bearing shield 6, which is at the input end of the housing 1, carries a bearing 5 for a quill drive assembly 13, 15, and a bearing 7 for a stub axle 22 on the other end of the planet gear carrier 8; the axle 22 is not restrained against axial movement in the bearing 7. Obviously, the planet gear carrier 8 may be made in two parts, one part for each group of planet gears, the two parts being rigidly secured to each other so that they rotate synchronously.

Two groups of planet gears 9 and 10 (there are three planet gears in each group) are mounted in the planet gear carrier 8 by means of shafts 11, each gear 9 being axially aligned with a gear 10 and both said gears being mounted rotatably on one shaft 11. The three planet gears 9 all mesh with the internally toothed gear or rim gear 2, whilst the three planet gears 10 all mesh with the internally toothed gear or rim gear 3, the planet gears being equiangularly spaced around the rim gears. There may be any plural number of planet gears in each of the two groups thereof.

The quill drive assembly comprises a central solid shaft 13 and an outer hollow shaft 15 which is normally concentric with the shaft 13. At the drive input end the two shafts 13 and 15 of the quill drive are both connected to a common coupling element 16 by which the drive input is transmitted from the coupling sleeve 17 to the said shafts. Only the outer hollow shaft 15 of the quill drive is actually mounted in the bearing 5, and such mounting allows rotation movement but not axial movement of the quill drive.

A pinion 12 is rigidly mounted on or forms part of the opposite or free end of the central shaft 13, and provides a sun wheel which meshes with the three planet gears 9.

Similarly, a pinion 14 is rigidly mounted on or forms part of the opposite or free end of the outer hollow shaft 15, and provides a sun wheel which meshes with the three planet gears 10.

The two sun-and-planet assemblies, one assembly comprising the sun wheel 12, planet gears 9, and rim gear 2, the other assembly comprising the sun wheel 14, planet gears 10 and rim gear 3, are parallel to each other.

The two shafts 13 and 15 of the quill drive should have the same torsional rigidity.

Figure 3:
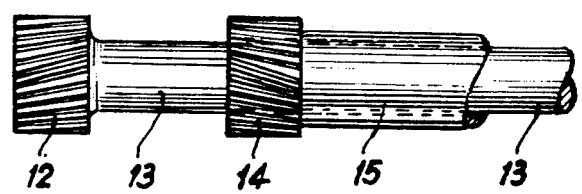
FIG. 3 is an elevation of part of a quill shaft which is part of an embodiment of the invention using helical gears.

When a torque is transmitted from the sleeve 17 to the sleeve 19, it is assumed that the drive is effected uniformly so that the right-hand or input ends of the two shafts 13, 15 also rotate at uniform speed. In the event of any non-uniform features (for example, unequal cumulative errors in the two sun-and-planet assemblies) occurring in the transmission from the sun wheel 12 to the planet gears 9 and thence to the rim gear 2, and/or from the sun wheel 14 to the planet gears 10 and thence to the rim gear 3, the result is a negligibly small inequality of loading between the two groups of planet gears, since the shafts 13 and 15 provide an immediate load compensation by allowing one pinion 12 or 14 to lead and the other of said pinions to lag. The load is therefore distributed substantially uniformly between the two groups of planet gears. Advantageously, if the sun-and-planet assemblies have helical toothing, as shown in FIG. 3 with respect to the sun wheels only, the handing of the sets is opposite, that is, one pinion 12 or 14 is right-handed and the other said pinion is left-handed. Noise is therefore reduced and the opposite handed feature causes axial forces in the system to be cancelled.

What I claim and desire to secure by Letters Patent is:

1. A planetary gearing drive transmission, comprising two similar sun-and-planet assemblies disposed parallel to each other, each said assembly comprising a sun wheel, a group of planet gears, and an outer internally toothed rim gear, the two said assemblies being connected to each other by means of the two rim gears which are mounted on a common carrier, each planet gear being mounted freely rotatable on a spindle carried by a planet gear carrier, the planet gear carriers being rotatable solidly with each other, the two sun wheels of the two said assemblies being mounted on a quill drive comprising two concentric shafts connected to each other and to a drive transmission element at one end, one of the said sun wheels being mounted rigidly on the free end of the inner shaft of the said two quill drive shafts and the other said sun wheel being mounted rigidly on the free end of the outer shaft of the said two quill drive shafts, characterized in that the two concentric shafts of the quill drive have substantially the same torsional rigidity whereby the torques which the transmission is required to transmit are distributed substantially uniformly between the two said assemblies entirely alone and independently of any other device.

2. A planetary gearing drive transmission according to claim 1, characterized in that the two sun-and-planet assemblies each have a single helical tooth gearing system, the two tooth systems being oppositely handed.

References Cited

UNITED STATES PATENTS

| | | | |
|---|---|---|---|
| 3,011,365 | 12/1961 | Stoeckicht | 74—801 |
| 3,021,731 | 2/1962 | Stoeckicht | 74—801 |
| 3,090,258 | 5/1963 | Zink et al. | 74—801 |
| 3,188,888 | 6/1965 | Zink et al. | 74—801 |

FRED C. MATTERN, Jr., *Primary Examiner.*

ARTHUR T. McKEON, *Assistant Examiner.*